C. NELSON.
ICE CREAM CABINET.
APPLICATION FILED DEC. 26, 1912.
1,069,071.
Patented July 29, 1913.
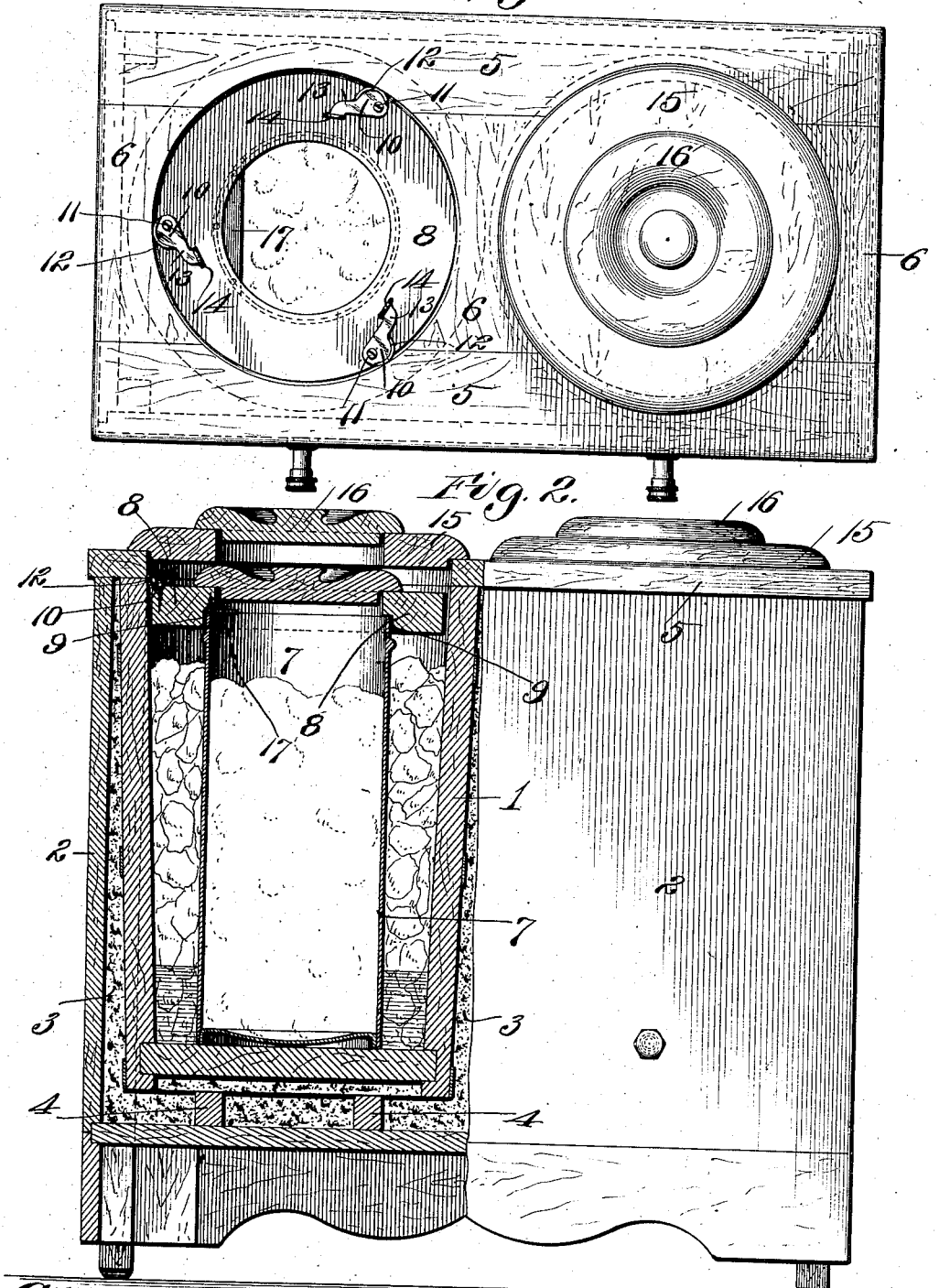

UNITED STATES PATENT OFFICE.

CHARLES NELSON, OF ST. LOUIS, MISSOURI.

ICE-CREAM CABINET.

1,069,071.  Specification of Letters Patent.  Patented July 29, 1913.

Application filed December 26, 1912. Serial No. 738,768.

*To all whom it may concern:*

Be it known that I, CHARLES NELSON, a citizen of the United States, residing in the city of St. Louis and State of Missouri, have invented a new and useful Ice-Cream Cabinet, of which the following is a specification.

This invention relates to ice cream cabinets, and it consists of a case containing one or more compartments whose walls are separated from the walls of the case by a space containing a filler, a can or vessel adapted to contain the ice cream and to be inclosed within the compartment, a holder arranged to rest upon the top of the can or container and being provided with an opening through which the contents of the can or container are accessible, locking means whereby the holder can be held in locked engagement with the compartment to prevent rising or floating of the can or container, and a suitable cover for closing the top of the compartment.

The object of the invention is to provide an improved ice cream cabinet of the general construction specified.

Another object is to provide an ice cream cabinet comprising a compartment, a can or container adapted to rest within the compartments, a holder resting upon the top of the can or container and provided with an opening through which the contents of the can or container are accessible, locking devices for locking the holder in position within the compartment, a support adapted to rest upon the top of the compartment and provided with a central opening through which access may be had to the can or container, and a lid which is interchangeable and may be placed in position to close the opening through said support or through said holder, as desired.

With these and other objects in view I have embodied my invention in a form which is illustrated in the accompanying drawing in which, Figure 1 is a plan view of a cabinet composed of two compartments, one of which is shown with the lid or cover removed in order to disclose the holder and the locking devices therefor. Fig. 2 is a combined elevation and sectional view illustrating other details and features of the invention.

In the form shown the cabinet is substantially rectangular in shape and consists of two compartments one of which is shown in section in Fig. 2 and the walls of which are designated by the reference number 1. Between the walls of the compartments and the walls of the case 2 is a space which is filled with a filler 3, preferably of ground cork or other suitable material. Cross members 4 rest upon the bottom of the case 2 and constitute supports for holding the compartments at an elevation above the bottom of the case 2 and form a space between the bottom of the compartment and the bottom of the case, in which space the filler material 3 is also contained.

The top of the case consists of two longitudinal members 5, extending from end to end of the case. The members 5 have the grain extending longitudinally. Cross members 6 are secured between the longitudinal members 5 with the grain thereof extending transversely to the grain of the members 6, which construction I have found to be superior. The members 5 and 6 are cut away to provide openings of substantially the same diameter as the interior of the compartments 1. Through the openings thus provided the cans or containers are inserted and removed, and the ice is also inserted through these openings.

A can or container 7 adapted to contain ice cream is shown in Fig. 2. The can or container rests upon the bottom of the compartment 1, and leaves a space between the walls thereof and the walls of said compartment into which the ice is filled, as shown.

A holder 8 is provided for each compartment, and is of such a size that it will readily pass into the compartment. A central hole or opening is formed through the holder 8, and around the central opening a recess 9 is formed, so that when the holder is placed within the compartment the upper end of the can or container 7 will be received within the recess 9, while that part of the holder 8 which is above the recess 9 rests upon the upper edge of the can or container, thereby supporting the holder in position. The holder thus positioned constitutes a closure to retain the cold air around the can or container, and to prevent the warm air from passing into the compartment below the top of the can or container.

In the embodiment shown the locking devices for locking the holder 8 in position comprise plates 10 pivoted to the upper side of the holder by pivots 11, and provided with upturned edges 12 which are eccentric with respect to the pivots. Levers 13 are formed integral with the eccentric locks 10, and are provided on their outer ends with upturned parts 14 which constitute means for manual engagement for manipulation of the locks. The locks are pivoted near the edge of the holder 8, so that when the eccentric locks 10 are turned in one direction the upturned locking edges 12 will be pressed against the inner wall of the compartment and thereby firmly lock the holder in position. Because of the engagement of the can or container 7 under the holder the can or container will also be locked in position, and will be prevented from floating or rising as the contents thereof are removed and the can or container becomes lighter. Thus the can or container will be rigidly held within one position at all times, and cannot move around as the contents are removed, which frequently occurs where no locking device is employed, thereby constituting an inconvenience and soiling the clothes of the user.

A support 15 is arranged to interlock with the top of the case within the opening to the compartment, and is provided with a central opening through which access may be had to the contents of the can or container. The central opening through the support 15 is preferably of substantially the same size as the central opening through the holder 8. A lid or closure 16 may be employed to close the opening through the support 15, and since the openings through the support 15 and the holder 8 are approximately of the same size the lid or closure 16 is interchangeable and may be used to close either of said openings. If preferred one lid or closure may be used to close the opening through the support 15 and a duplicate lid or closure may be employed to close the opening through the holder 8 as shown in Fig. 2.

A blade 17 is secured to the holder 8 below that part thereof which extends above the cam or container 7. The blade is at one side of the opening through the holder and is provided with a straight edge against which the dipper may be turned to cut off and remove the excess quantity of the ice cream which projects from the dipper. In the construction shown the blade is removably secured in position by means of screws, but it is obvious that any suitable fastening device may be employed.

I do not restrict myself to identical features of construction except as pointed out in the appended claims.

What I claim and desire to secure by Letters Patent is:

1. In an ice cream cabinet, the combination with a compartment arranged to contain a container and also to contain ice between said container and the wall of said compartment, of a container in said compartment, a holder extending over the upper edge of said container and preventing lateral movement of said container, locking plates pivoted upon said holder and adjustable to engage with the inner surface of said compartment effectively to lock said holder in position in said compartment, a removable support upon said compartment above said holder, and interchangeable closures for openings through said holder and said support, substantially as specified.

2. In an ice cream cabinet, the combination with a compartment having an open end, a container in said compartment, a holder having a central opening and having a recess around said opening, said recess receiving the upper end of said container and said opening constituting a passage into said container, locking plates carried by said holder, means for engaging said locking plates with the wall of said compartment effectively to lock said holder and said container in rigid adjustment, a removable support upon said compartment provided with an opening in alinement with the opening through said holder, and interchangeable closures for said openings, substantially as specified.

In witness whereof, I have signed this specification in the presence of two subscribing witnesses.

CHARLES NELSON.

Witnesses:
J. L. NELSON,
L. C. KINGSLAND.